United States Patent
Tateyama

[19]

[11] Patent Number: 6,102,481
[45] Date of Patent: Aug. 15, 2000

[54] VEHICLE SEAT

[75] Inventor: Hiroyuki Tateyama, Kariya, Japan

[73] Assignee: Araco Kabushiki Kaisha, Japan

[21] Appl. No.: 09/139,484

[22] Filed: Aug. 25, 1998

[30] Foreign Application Priority Data

Aug. 25, 1997 [JP] Japan ..................................... 9-228193

[51] Int. Cl.$^7$ .................................................. A47C 7/40
[52] U.S. Cl. ............................... 297/452.35; 297/452.34; 297/411.41; 297/464
[58] Field of Search .............................. 297/411.41, 464, 297/486, 452.34, 452.35, 452.36, 452.18, DIG. 2; 264/41, 46.4, 46.7, 46.8

[56] References Cited

U.S. PATENT DOCUMENTS

| | | | |
|---|---|---|---|
| 2,838,100 | 6/1958 | Follows | 297/411.44 |
| 3,112,987 | 12/1963 | Griffiths et al. | 297/DIG. 2 X |
| 3,922,030 | 11/1975 | Stedman . | |
| 4,350,544 | 9/1982 | Matsuno . | |
| 4,537,446 | 8/1985 | Roney et al. . | |
| 4,623,196 | 11/1986 | Roney . | |
| 4,679,854 | 7/1987 | Putsch et al. | 297/486 |
| 4,738,809 | 4/1988 | Storch | 264/46.6 |
| 4,810,035 | 3/1989 | Takahashi . | |
| 4,973,235 | 11/1990 | Shoji | 264/46.4 X |
| 5,048,894 | 9/1991 | Miyajima et al. . | |
| 5,342,569 | 8/1994 | Murasaki | 264/46.4 X |
| 5,558,731 | 9/1996 | Labrie et al. | 264/46.4 X |
| 5,810,438 | 9/1998 | Newhouse | 297/411.41 X |
| 5,851,457 | 12/1998 | Peterson et al. | 264/46.8 X |

FOREIGN PATENT DOCUMENTS

| | | |
|---|---|---|
| 46-056825 | 6/1971 | Japan . |
| 51-14624 | 2/1976 | Japan . |
| 59-45820 | 3/1984 | Japan . |
| 59-121891 | 8/1984 | Japan . |
| 59-177191 | 11/1984 | Japan . |
| 62-164545 | 10/1987 | Japan . |
| 63-146292 | 11/1988 | Japan . |
| 1-19625 | 2/1989 | Japan . |
| 1-126678 | 10/1989 | Japan . |
| 2-100607 | 9/1990 | Japan . |
| 01217320 | 4/1991 | Japan . |

*Primary Examiner*—Peter R. Brown
*Attorney, Agent, or Firm*—Douglas J. Christensen

[57] ABSTRACT

Vehicle seats are constructed with a seat cushion for supporting the lower body of a passenger and a seat back for supporting the upper body of the passenger. A side holder portion, which is filled with foam material for supporting said passenger at side portions of the upper body, is combined with a backrest portion, which also is filled with foam material for supporting said passenger on the back, such that said side holder portion is integrally and continuously formed with said backrest portion. An opening portion preferably is formed in each of the side holder portions such that said opening portion provides a hole in said side holder portion.

10 Claims, 8 Drawing Sheets

VEHICLE SEAT

BACKGROUND OF THE INVENTION

1. Field of the Invention

The present invention relates to seats capable of being mounted in a vehicle, and more particularly, relates to vehicle seats in which side holders of the left-hand and right-hand sides are integrally formed with a seat back. Methods of manufacturing such seats also are described.

2. Description of the Related Art

Japanese Laid-Open Utility Model Publication Nos. H2-66200 and S64-71535 disclose related designs and techniques for constructing a seat that can be mounted in an industrial vehicle such as a forklift. According to the teachings of H2-66200, a seat is constructed as shown in FIG. 10. On the both the left-hand and right-hand side of a seat back 2, side portions 4 and 5 are formed to project forward. Each side portion 4 and 5 has a curved surface from a backrest portion 3 of the seat back 2.

According to the teachings of S64-71535, a seat is designed and constructed as shown in FIG. 11. Mount portions 8 and 9 are attached to a seat back 7 and a frame 10 is formed by bending a metal pipe attached to the mount portions 8 and 9, so that side supports 13 are formed.

With respect to seat 1 of FIG. 10, although the seat back 2 supports the upper body of a passenger with both the back 3 and side portions 4 and 5, the passenger easily sticks the seat back 2 in place(s) where his body is in contact with the seat back 2 if the passenger remains seated for many hours.

On the other hand, with respect to the seat of FIG. 11, the sticking problem is reduced as a result of the space that is created between the seat back 7 and the frame 10, because the passenger's body closely contacts seat 6 at fewer positions than seat 1. However, the arms and body of the passenger will directly contact the metallic portion of the frame 10, which contact can be painful for the passenger, especially when the passenger must remain seated for a prolonged period of time. Further, vehicle seats constructed according to the teachings of S64-71535 are known to deteriorate with use.

SUMMARY OF THE INVENTION

Accordingly, an object of the present invention is to overcome the disadvantages of prior art seats and provide a comfortable, durable seat for vehicles.

In particular, vehicle seats are taught that have an excellent texture and a design that securely and comfortably supports the passenger. However, the present seats are not prone to stick to the passenger after prolonged contact. Also, vehicle seats are taught that are durable for extended use.

Preferably, vehicle seats have a seat cushion for supporting the lower body of a passenger and a seat back for supporting the upper body of the passenger. The seat back preferably is formed by integrally and contiguously combining side holder portions with a backrest portion. Preferably, the backrest portion and side holder portions are filled with a foam material to support the back and side portions of the passenger, respectively. Each side holder portion preferably has an opening portion or aperture that is formed within the side holder portion.

Vehicle seats constructed in this manner will securely support a passenger at side portions of the upper body. The holes in the side holder portions solve the problem of stickiness to the body of the passenger. In addition, since the side holder portions and the backrest portion are filled with a foamed material and are integrally and contiguously combined, the vehicle seat has an excellent texture that substantially reduces pain that typically results from prolonged sitting in known seats.

Vehicle seats constructed in this manner are preferably used in industrial vehicles, such as forklifts. However, these seats may also generally be used in passenger cars, leisure vehicles, buses, trucks, etc., because these seat designs are applicable to a wide variety of vehicles.

Further, according to the method of manufacturing a vehicle seat having a structure as described above, a seat back frame that has a shape corresponding to the shape of the backrest portion and the side holder portion is fixed within a seat back shaping die. Foam is then injected into the seat back shaping die and the seat back is formed. The shaped seat back is attached to the seat cushion to complete the construction of the vehicle seat described above.

Additional objects, features and advantages of the present invention will be understood by reviewing the detailed description of the invention and the claims in conjunction with the drawings.

DETAILED DESCRIPTION OF THE INVENTION

Figure 1:
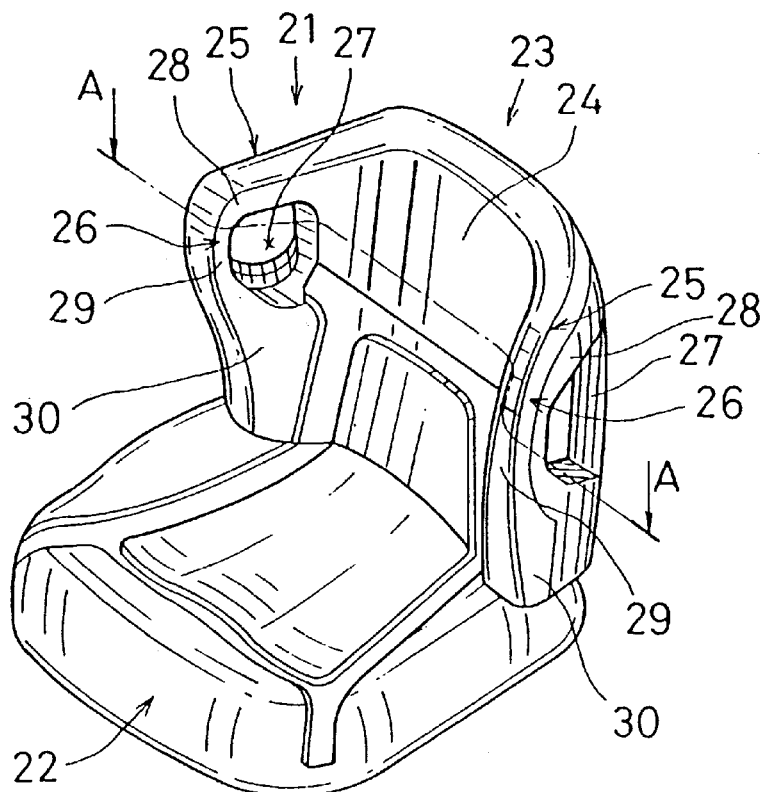
FIG. 1 is a perspective view of a representative example of a seat for a vehicle.

In a preferred aspect of the present teachings, seats for a vehicle are taught, in which the seat includes a seat cushion for supporting the lower body of a passenger and a seat back for supporting the upper body of a passenger. Preferably, the seat back includes a side holder portion that is filled with a foam material. The foam material may be useful for supporting the passenger at the sides of the upper body. This seat back may be combined with a backrest portion that also is filled with foam material to support the back of the passenger. Preferably, the side holder portions form a single unit with the backrest portion. Further, an aperture or opening portion may be formed in each side holder portion such that the opening portions provide holes in the side holder portions.

In another aspect, the side holder portion may be integrally combined with the seat back so as to provide an opening outward from the side portions at an obtuse angle.

The side holder portion(s) of the seat may optionally include an upper protrusion that supports the flank of the passenger and a lower protrusion that supports the waist of the passenger. The opening portion may be formed in the upper protrusion and/or in the lower protrusion.

An assist grip portion may be optionally formed as a peripheral portion of the side holder portion and said opening portion.

Vehicle seats constructed according to any of these variations of the present teachings are preferably used in industrial vehicles, such as forklifts. However, these seats may also generally be used in passenger cars, leisure vehicles, buses, trucks, etc.

In another preferred aspect of the present teachings, methods of manufacturing the above described vehicle seats are provided. These methods generally may include the steps of:

A. fixing a seat back frame in a seat back shaping die, wherein the shape of the seat back shaping die corresponds to the shapes of the backrest portion and the side holder portion; and B. injecting a foaming agent into the seat back shaping die to which the seat back frame is fixed, and thereby forming a foam material shape around the seat back frame, wherein the shape of the seat is produced by the foam material shape.

This method optionally may utilize a seat back frame that has a main frame, which forms a frame of said backrest portion, and a side frame, which is attached to or continuous with the side portions of the main frame, so as provide a seat shape that opens outwardly at an obtuse angle between the main frame and the side frame. The side frames are preferably arranged in relation to the main frame in a manner that creates a space corresponding to the aperture or opening portion that will be formed during the foam injection step.

These methods may further optionally utilize an opening shaping means that is attached to or continuous with the seat back shaping die at a position that corresponds to the side holder portions, to thereby form a gap within the side holder portions. The opening shaping means preferably functions to block the injection of the foaming agent within the seat back shaping die so that the opening portion(s) can be formed. The opening shaping means can be inserted into the seat back shaping die in such a manner that permits the opening shaping means to move forward and backward.

These methods may also optionally include a step of placing a seat covering material within the seat back shaping die before injecting the foaming agent into the seat back shaping die. The seat covering material can be used to form an outer surface of the seat back. The seat covering material may additionally be fixed inside the seat back shaping die in tight contact with a shaping surface of the seat back shaping die after the frames have been fixed within the seat back shaping die, but before injecting the foaming agent inside the seat back shaping die.

Each of the additional features and method steps disclosed above and below may be utilized separately or in conjunction with other features and method steps to provide an improved vehicle seat. A representative example of the present invention, which example utilizes many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features steps disclosed in the following detail description may not be necessary to practice the invention in the broadest sense, and are instead taught merely to particularly describe a preferred embodiment of the invention.

Figure 2:
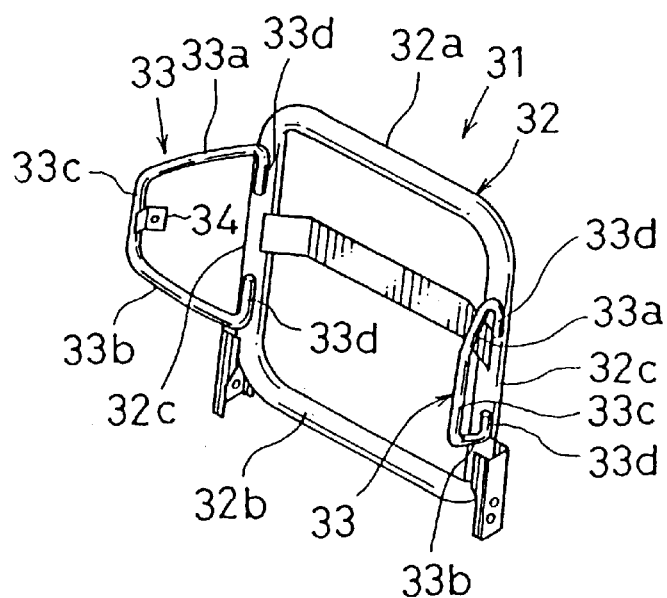
FIG. 2 is a perspective view of a representative example of a seat back frame.
Figure 9:
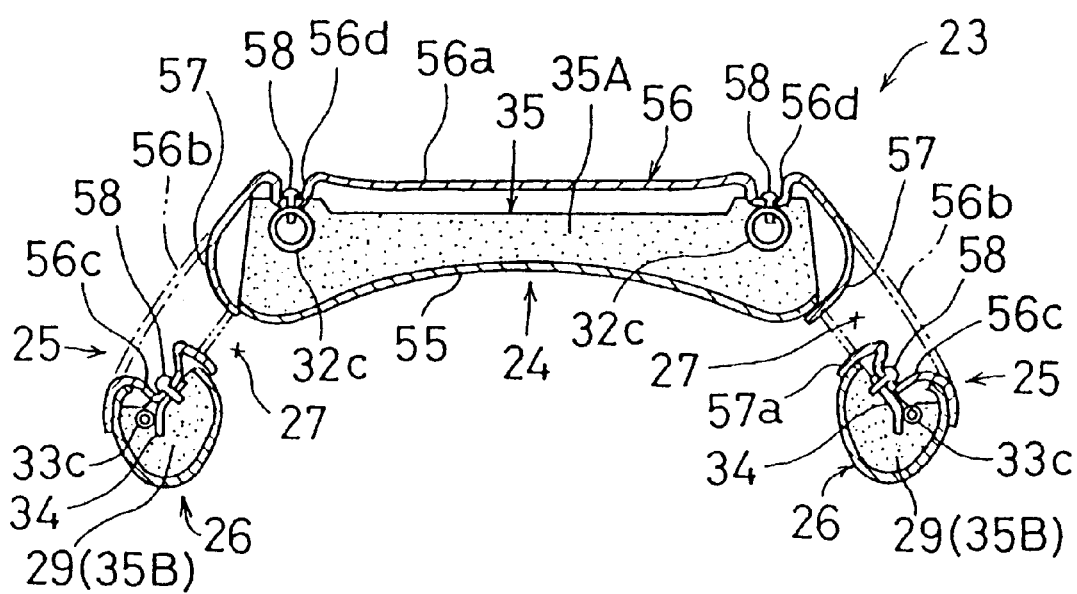
FIG. 9 is a cross sectional view of the seat back of FIG. 1 taken along a line A—A.
Figure 10:
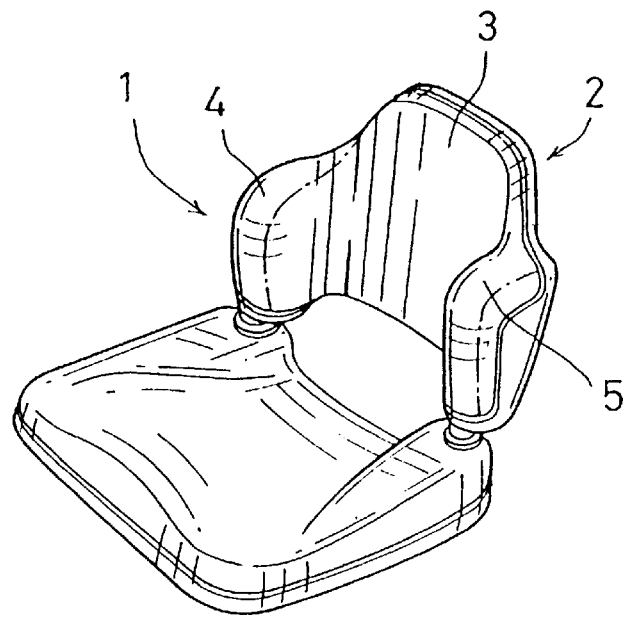
FIG. 10 is a perspective view of a known seat for a vehicle.
Figure 11:
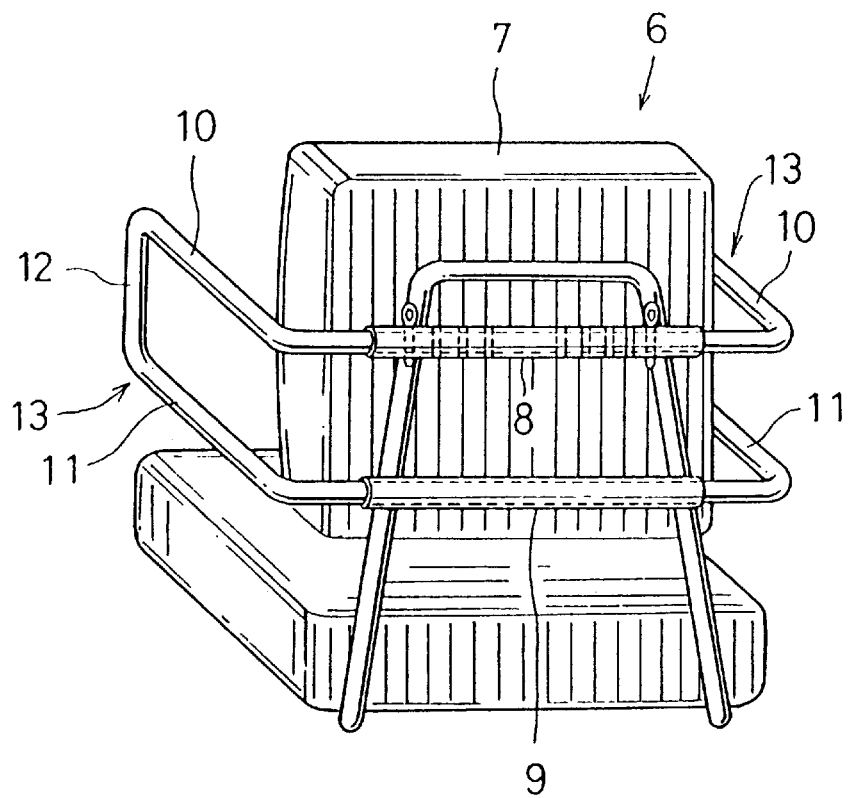
FIG. 11 is a perspective view of a second known vehicle seat as viewed from the back of the seat.

FIG. 1 shows a perspective view of a seat 21 for a vehicle. This vehicle seat 21 includes a seat cushion 22 and a seat back 23. FIG. 2 shows a perspective view of a seat back frame 31 that can be used to construct the vehicle seat 21 shown in FIG. 1. FIG. 9 shows a plan view of the seat back 23, and in particular shows a cross section of the vehicle seat 21 of FIG. 1 taken along a line A—A. This seat may be utilized for a variety of vehicles, but preferably is utilized for a forklift. The construction of a preferred vehicle seat according to the present teachings will be described with reference to these three figures.

The seat back 23 is formed by a backrest portion 24, and side holder portion 25 that open outwardly at an obtuse angle on the left-hand and right-hand sides to the backrest portion 24. In the side holder portion 25, an upper protrusion 26 is formed to support a seated passenger at the side portions of passenger's upper body. In the upper protrusion 26, opening portions 27 having a predetermined diameter are formed to provide a perforation or hole in the side holder portion 25. Further, an upper elbow portion 28 and a front elbow portion 29 are formed to extend contiguously and integrally from the backrest portion 24. Below the upper protrusion 26, a lower protrusion 30 is formed to be smaller relative to the upper protrusion 26 and contiguously connected to a bottom portion of the backrest portion 24, so that a passenger can be supported by the lower protrusion 30 at waist level.

The seat back 23 can be constructed using (i) the seat back frame 31 shown in FIG. 2, (ii) the seat back pad 35 shown in FIG. 9, which seat back pad 35 is used to insert-shape the seat back frame 31, (iii) a seat covering material 55 that is shaped integrally with or separately from the seat back pad 35, and (iv) a back board 56 shown in FIG. 9 that is attached to the rear of the seat back 23.

As shown in FIG. 2, the seat back frame 31 has a main frame 32 that forms the backrest portion 24 and side frames 33 that form the side holder portions 25. The main frame 32 is constructed by bending a metal pipe into a shape of a frame, and preferably includes an upper frame 32a, a lower frame 32b and vertical frames 32c for the left-hand and right-hand sides. The side frames 33 may be attached to the vertical frames 32c at predetermined positions. The side frames 33 are each constructed by bending a rod material and include an upper frame 33a, a lower frame 33b and a front frame 33c. The upper frame 33a and the lower frame 33b are disposed so as to open outwardly at an obtuse angle from the main frame 32 to the left-hand and right-hand sides. Mounts 33d are formed at ends of the side frames 33. The side frames 33 are attached by welding means or the like to the left-hand side and the right-hand side of vertical frames 32c of the main frame 32, through the mounts 33d, at a predetermined angle so as to open outwardly. Further, a mounting bracket 34 for bonding the back board 56 (see FIG. 9) is attached to the front frames 33c of the side frames 33 at predetermined positions.

In addition, the seat covering material 55 optionally may be integrally shaped by expansion shaping to produce the seat back 23. FIGS. 3 through 9 show such methods in further detail. The seat cushion 22 may be formed using any of a variety of known shaping methods and therefore, a method of shaping the seat cushion 22 need not be described in detail.

Figure 3:
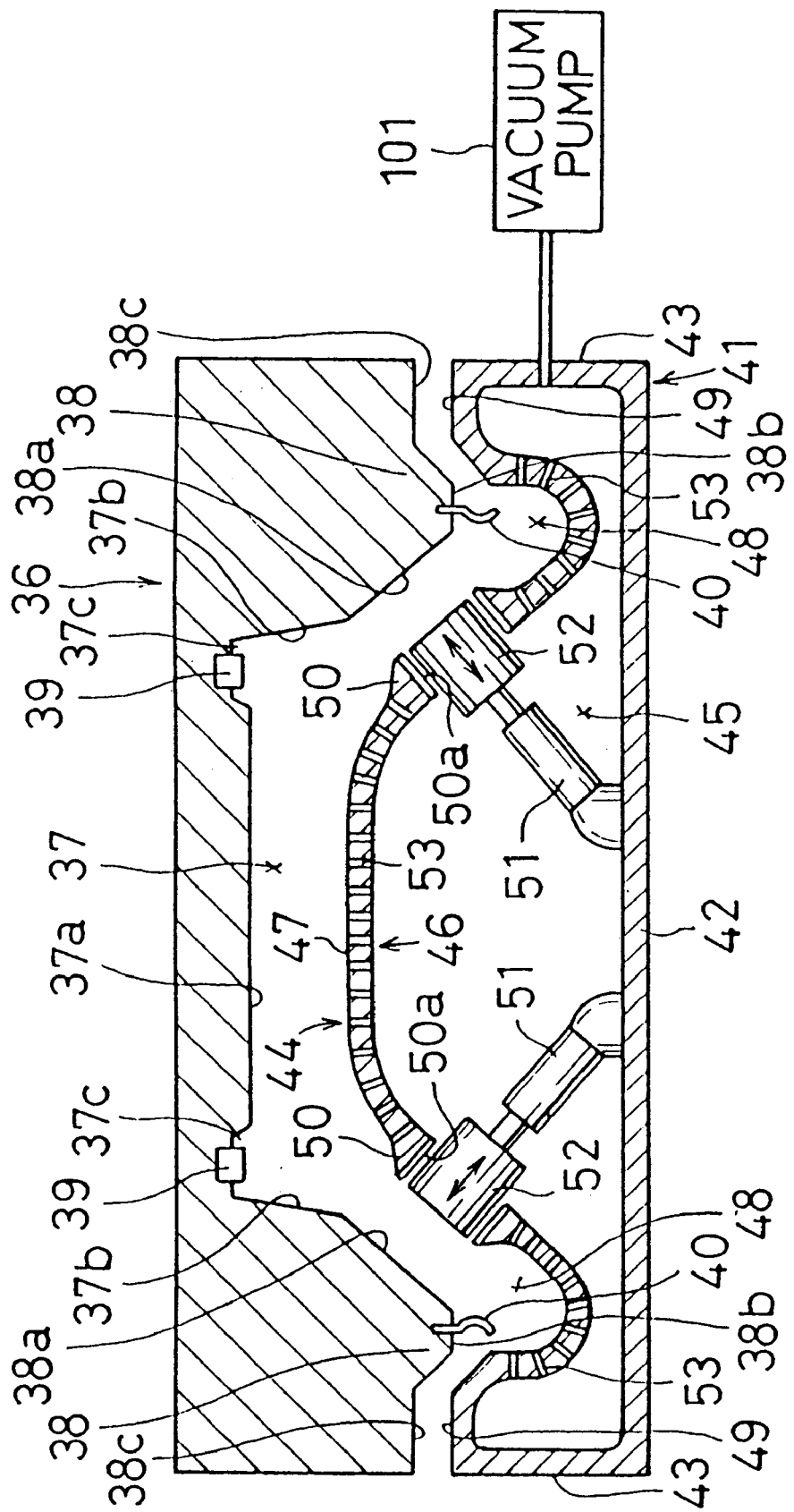
FIG. 3 is a cross sectional view of a representative seat back shaping die having top and bottom metal dies.

A seat back shaping die for shaping the seat back 23 preferably is constructed with a top die 36 and a bottom die 41 such as is shown in FIG. 3. A backrest shaping portion 37 is disposed in the top die 36 and is used for shaping a backrest pad portion 35A of the backrest portion 24 shown in FIG. 9. The backrest-shaping portion 37 preferably has a horizontal surface 37a and a pair of angled surfaces 37b on the left-hand and right-hand sides of the horizontal surface 37a. Further, on the left-hand and right-hand sides of the backrest shaping portion 37, side holder shaping portions 38 are formed to have a symmetrical configuration for shaping the side holder portion 25 shown in FIG. 9.

The side holder shaping portions 38 shown in FIG. 3 are formed to correspond to the angle at which the side holder portion 25 expands so as to open outwardly to the left-hand and right-hand sides of the backrest portion 24. The side holder shaping portions 38 include angled surfaces 38a and horizontal receiving surfaces 38b extend from the ends of the angled surfaces 38a. Further, hold-down surfaces 38c, which are each a combination of an angled surface and a horizontal surface, are formed to the outside of the receiving surfaces 38b. These hold-down surfaces 38c serve to hold down the seat covering material 55 shown in FIG. 9 during shaping of the seat back 23 and will be described further below.

In addition, recessed portions 37c may be formed on the left-hand and right-hand sides of the horizontal surface 37a of the backrest-shaping portion 37. In the recessed portions 37c, as shown in FIG. 3, attaching members 39 (e.g., a magnet) for mounting to the vertical frames 32c of the main frame 32 are disposed. Further, on the receiving surfaces 38b of the side holder shaping portions 38 on the left-hand side and the right-hand side, spring members 40 for elastically urging the front frames 33c of the side frames 33 are disposed as shown in FIG. 3.

In the bottom die 41, side plates 43 are formed along the four sides of a bottom plate 42, and a shaping portion 44 spans the side plates 43, thereby defining a hollow space 45. In a central portion of the shaping portion 44, a backrest inside surface shaping portion 46, which includes a swelled surface 47, is formed in order to shape the inside surface of the backrest portion 24 shown in FIGS. 1 and 9. The inside surface is the side in which the passenger makes contact with the seat.

On the left-hand and right-hand sides of the backrest inside surface shaping portion 46, the side holder inside surface shaping portions 48 are formed and are used to shape the surface of the side holder portion 25 on which the passenger makes contact with the seat. Between the swelled surface 47 and the side holder inside surface shaping portions 48, an angled surface is formed to be the opening angle of the side holder portion 25. Further, at the ends of the side holder inside surface shaping portions 48, hold-down surfaces 49 are formed. These hold-down surfaces 49 hold down the seat covering material 55 in a similar manner to the hold-down surfaces 38c of the top die 36.

Thick portions 50 preferably are formed along the outward side of angled surfaces between the swelled surface 47 and a pair of side holders inside surface shaping portions 48. The thick portions 50 each include an operation member 51 that is preferably is an electromagnetic solenoid, a working cylinder or a means for performing a similar function disposed on the side of the bottom plate 42, and an opening shaping member 52 mounted to the operation member 51.

The opening shaping member 52 reciprocally slides within a hole 50a, and is moved by the operation member 51. In the shaping portion 44 of the bottom die 41, a plurality of suction holes 53 are created as shown in FIG. 3. The hollow space 45 of the bottom die 41 is connected to a vacuum apparatus 101.

Figure 4:
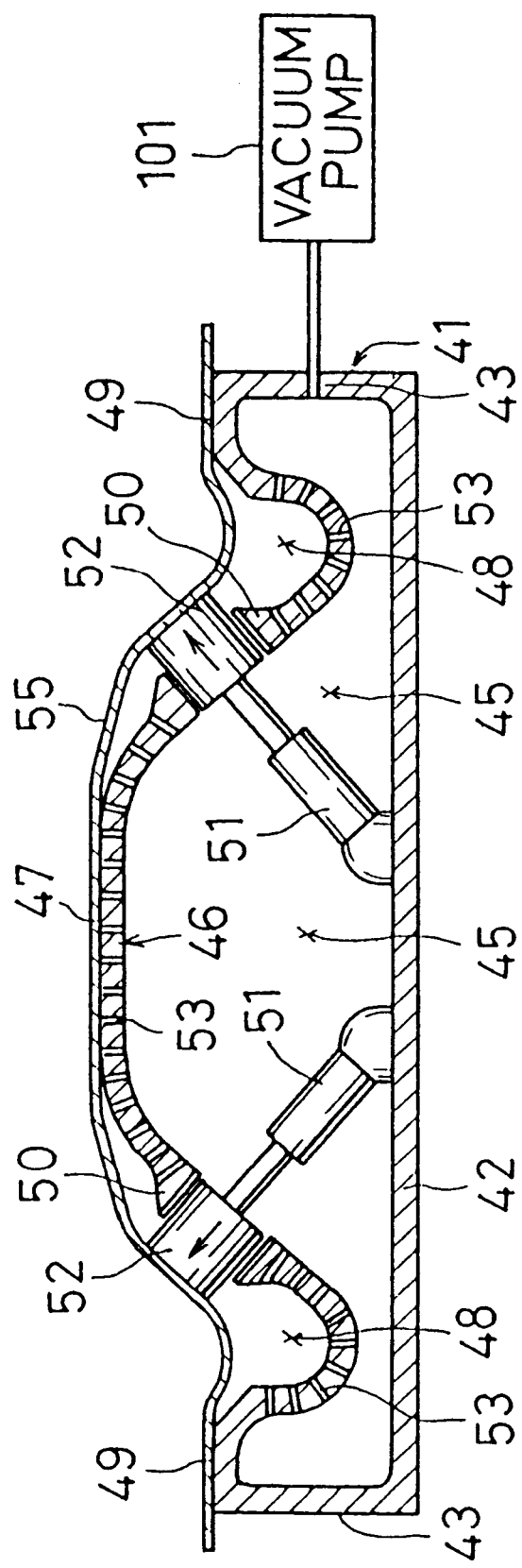
FIG. 4 shows a representative example of a surface material set in the bottom die.

Referring to FIG. 4, in order to shape the seat back 23 using the top die 36 and the bottom die 41, the operation member 51 is operated in a such way that the opening shaping member 52 protrudes a predetermined distance from the thick portions 50 while the seat back shaping metallic die is in the open position. In this configuration, the seat covering material 55 is placed on the bottom die 41. The seat covering material 55 may be, for example, a vinyl chloride resin and may be cut from a single sheet into a shape that has a trimming margin along the sides of the cut material. The seat covering material 55 is preferably fixed in the die and heated at a temperature that is sufficient to soften the seat covering material 55 before the next step.

Figure 5:
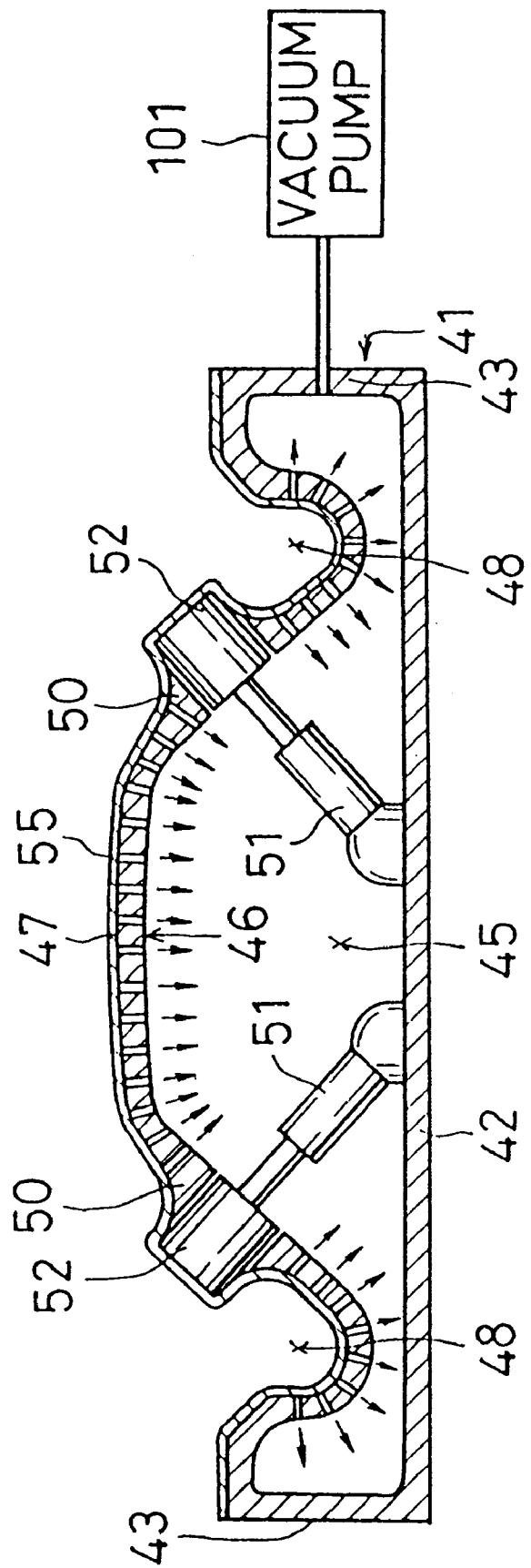
FIG. 5 shows a preliminary shaping of the surface material that was set in the bottom die according to FIG. 5.

After the seat covering material 55 has been softened, the vacuum apparatus 101 connected to the bottom die 41 is operated as shown in FIG. 5. As a result, the seat covering material 55 is pulled by the suction force applied by suction holes 53 into tight contact with the swelled surface 47, the opening shaping member 52, the side holder inside surface shaping portions 48 and the like, and the seat covering material 55 is preliminarily shaped. As herein defined, preliminary shaping refers to the shaping of the seat covering material 55 to conform to the inside shape of the seat back 23.

Figure 6:
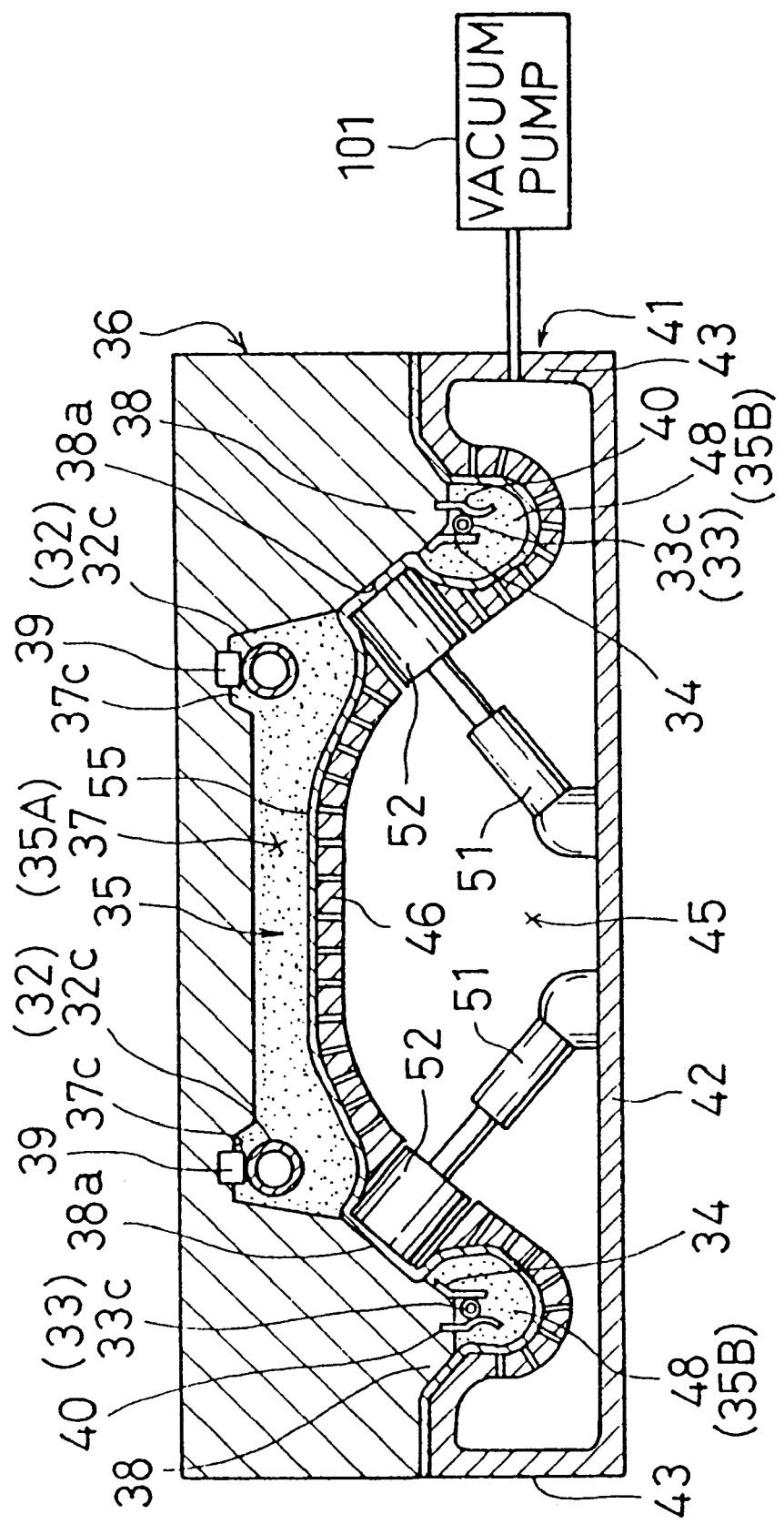
FIG. 6 shows a representative example of a foam-curing step with the top metal die and the bottom metal die closed.

Referring to FIG. 6, the left-hand and right-hand side vertical frames 32c of the main frame 32 are attached within the top die 36 by the attaching members 39 that are attached to the left-hand and right-hand side recessed portions 37c of the backrest shaping portion 37. The mounting brackets 34 attached to the left-hand and right-hand side front frames 33c of the side frames 33 are urged against the left-hand side and the right-hand side angled surfaces 38a of the side holder shaping portions 38. In this condition, the left-hand and right-hand side front frames 33c are elastically held between the left-hand and right-hand side spring members 40 that are attached to the holder shaping portions 38.

A foaming agent can then be injected into the cavity formed by the seat covering material 55 that is now held tightly to the bottom die 41. Preferably, the foaming agent is a urethane foaming agent, although other foaming agents may be utilized. The top die 36 is moved downward and closed over the bottom die 41, and the injected urethane foaming agent is permitted to cure. Once cured, the foam provides the shape of the backrest pad portion 35A in the backrest shaping portion 37 and side pad portion 35B that surrounds the opening shaping member 52, as shown in FIG. 6. In other words, the opening shaping member 52 forms a space in which injection of the foaming agent is blocked in the seat back 23 and serves to form the opening portions 27 (see FIGS. 1 and 9). Further, the seat covering material 55 integrally adheres to the respective pad portions 35A and 35B, thereby providing a foam-shaped form for the seat back 23, which is a preliminary product with the seat back frame 31 (see FIG. 2) that was internally inserted.

Figure 7:
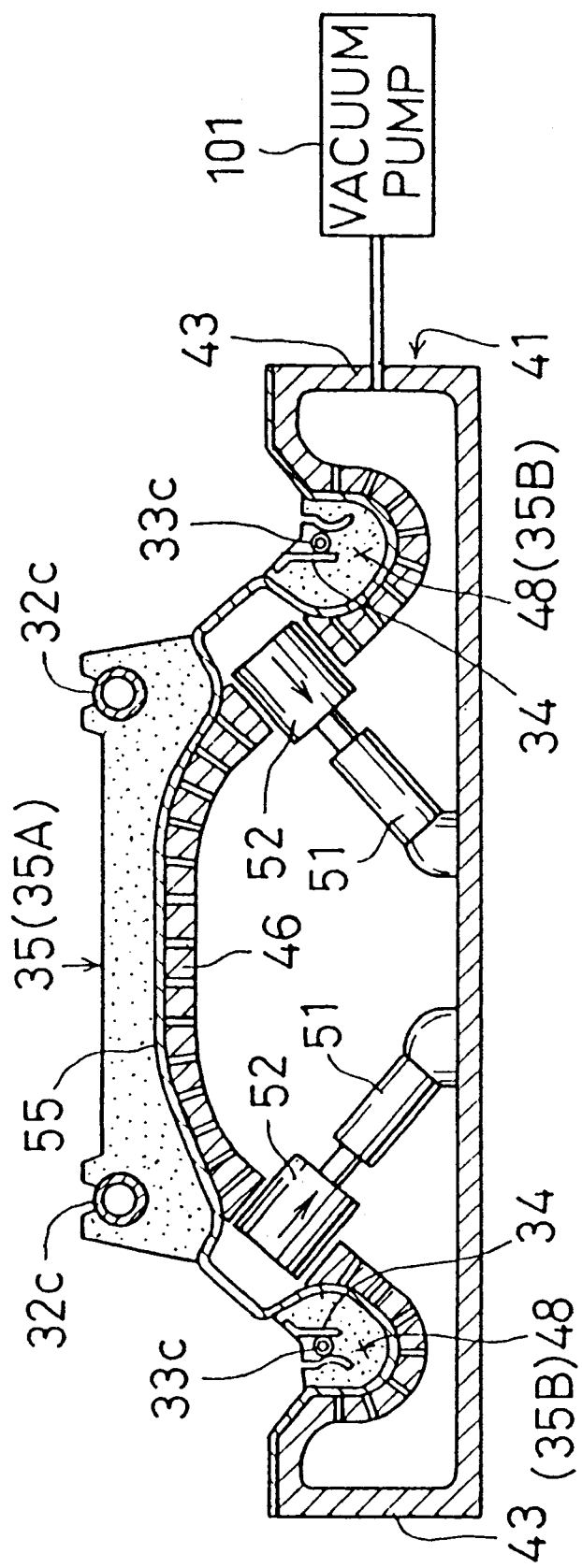
FIG. 7 shows a detaching step when the top die is opened after the foam-curing step of FIG. 6.

Referring to FIG. 7, the top die 36 is then detached from the bottom die 41 so that the shaping die is opened. In this open die state, the operation member 51 is operated to permit the opening shaping member 52 to push the seat back 23 upward and the seat back 23 is accordingly removed from the shaping die. The operation member 51 thereafter returns the opening shaping member 52 downward back inside the thick portions 50, in preparation for fabrication of a new seat back 23.

Figure 8:
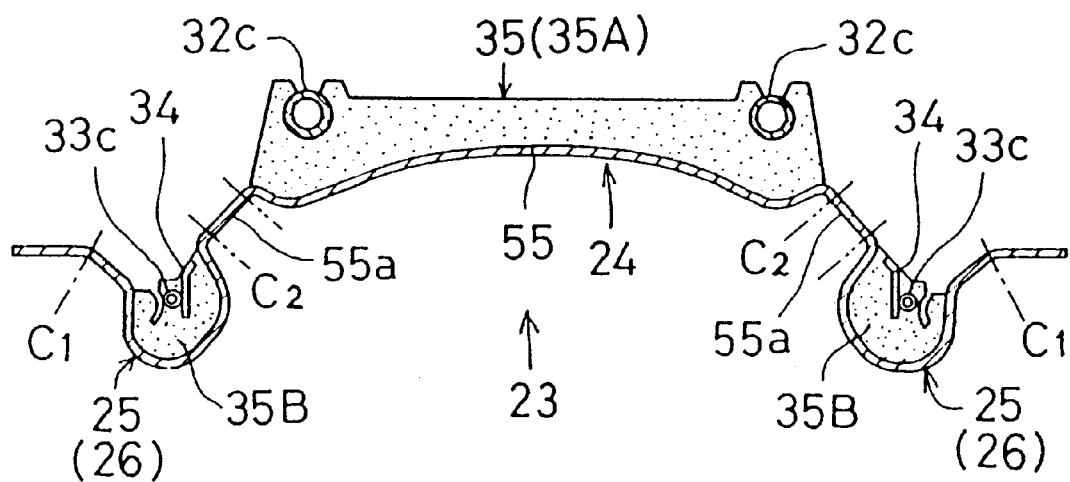
FIG. 8 is a cross sectional view of a representative example of a seat back that is obtained as a preliminary product after the detaching step.

Referring to FIG. 8, the trimming margin of the surface material 55 along the sides of the seat can be cut to provide a neat appearance (lines C1). The recessed portions 55a defined by the opening shaping member 52 also can be appropriately cut (lines C2). After which, the backboard 56 can be mounted to the rear of the seat back 23 as shown in FIG. 9.

Preferably, the backboard 56 is constructed from a resin material and includes a backrest panel portion 56a, which corresponds to the back surface of the backrest pad portion 35A, and side panel portions 56b, which are integrally formed on the left-hand and right-hand sides of the backrest panel portion 56a so as to open outwardly at a predetermined angle toward the left-hand and right-hand sides in accordance with the side pad portion 35B. In the side panel portions 56b of the left-hand and right-hand sides, apertures 57 each including an edge portion 57a are provided to correspond to the front elbow portion 29 side (see also FIG. 1). Mounting recess portions 56c are formed and fixed to the mounting bracket 34 (see also FIG. 2) that is attached to the front frames 33c of the side frames 33. Further, between the backrest panel portion 56a and the side panel portions 56b of the left-hand and right-hand side, recessed portions 56d are disposed and are fixed to the left-hand and right-hand side vertical frames 32c of the main frame 32 (see also FIG. 2).

The above-described backboard 56 preferably is secured to the vertical frames 32c of the main frame 32 and the front frames 33c of the side frames 33 through vises 58 in the mounting recess portions 56c and 56d. During the securing step, edges of the surface material 55 are covered so as to be held down at an edge portion of the backboard 56. Meanwhile, edges of the seat covering material 55, which are appropriately cut at the apertures 27 (see the lines C2 in FIG. 8), are covered so as to be held down at the edge portions 57a of the apertures 57 of the backboard 56. In the above-described seat back 23, the backrest portion 24 and the side holder portion 25 are formed integrally and contiguously, with the foaming agent filled inside the backrest portion 24 and the side holder portion 25, and the opening portions 27 are created in the upper protrusion 26 of the side holder portion 25. The seat back 23 can then be mounted to the seat cushion 22 as shown in FIG. 1 to complete the vehicle seat 21.

As shown in FIG. 2, the seat back frame 31 which forms the seat back 23 of the vehicle seat 21 includes (i) the main frame 32 having (a) upper and the lower frames 32a, 32b in approximately an orthogonal relationship and (b) the vertical frames 32c of the left-hand and right-hand sides, and (ii) the side frames 33 that are attached to the main frame 32 in a position to open outwardly to the left-hand and right-hand sides at obtuse angles to the main frame 32. The seat back pad 35 has a seat back frame 31 inserted therein. Because the backrest pad portion 35A and the side pad portion 35B are shaped on the side in which the passenger makes contact with the seat as generally shown in FIG. 9, the side holder portion 25, which includes the upper protrusion 26 for supporting the sides of the passenger's upper body, maintains the passenger in a stable seated posture. Further, the side pad portion 35B provides soft support. In addition, since the opening portions 27 are created in the upper protrusion 26, uncomfortable feelings due to stickiness or the like are minimized so that the passenger can remain comfortable, even if the passenger must be seated for a long period.

The opening portions 27 also may be disposed at a location that corresponds to the flank of a passenger, or at a location that corresponds to the waist of the passenger, or at both locations.

Further, since the upper elbow portion 28 is formed above the opening portions 27 of the side pad portion 35B and the front elbow portion 29 is formed contiguously with the side pad portion 35B on the front side to the opening portions 27, if the vehicle seat 21 is located in a relatively high position from the ground level, the upper elbow portion 28 and the front elbow portion 29 can be used as an assist grip, which allows the passenger to get in and out of the seat easier. Still further, since the opening portions 27 are disposed to the side holder portion 25, the freedom of design of the seat for a vehicle is improved.

In addition, since the apertures 57 that include the edge portions 57a along the opening portions 27 are created in the backboard 56, which is mounted to the back of the seat back 23, the edges of the surface material 55 that are created after the surface material 55 has been trimmed (see the Lines C2 in FIG. 8) may be concealed. Thus, this design permits an appealing finished product to be produced.

Although the representative example described above requires fixing the seat covering material 55 to the metal die to integrally foam-shape the seat covering material 55, this step is optional. The seat covering material 55 may instead be applied to cover the foam shape structure after the injection step, in which the foam is adhered to the seat back pad 35 with the seat back frame 31 inserted therein.

Further, if the side pad portion 35B of the seat back pad 35 is formed by a pad that is harder than the backrest pad portion 35B, the grip of the side pad portion 35B may be improved.

Finally, the opening portions 27 may be disposed at a plurality of positions within the side holder portion 25 shown in FIG. 1, and may have various opening shapes, such as for example circular and polygonal.

What is claimed is:

1. A seat for a vehicle, comprising:
    a seat cushion for supporting the lower body of a passenger; and
    a seat back for supporting the upper body of the passenger, the seat back comprising:
        a side holder portion containing a foam material to support the passenger along side portions of the upper body, the side holder portion having an aperture therein and including an upper protrusion and a lower protrusion, the upper protrusion configured for supporting said passenger at the flank and the lower protrusion configured for supporting said passenger on the side around the waist; and
        a backrest portion also containing a foamed material to support the back of the passenger, the side holder portion being integrally and contiguously formed with said backrest portion.

2. A seat as in claim 1, wherein said side holder portion opens outwardly at an obtuse angle from side portions of said backrest portions.

3. A seat as in claim 1, wherein the opening portion is formed in the upper protrusion and/or in the lower protrusion.

4. A seat as in claim 1, wherein an assist grip portion is formed in said side holder portion by a peripheral portion of the side holder portion and the aperture.

5. A method of manufacturing a seat as in claim 1, said method comprising the steps of:
    fixing a seat back frame, which has a shape which corresponds to the shapes of said backrest portion and said side holder portion, in a seat back shaping die; and
    injecting a foaming agent inside said seat back shaping die to which said seat back frame is fixed, to thereby prepare a shape for said seat back,
    said seat back including a side holder portion containing said foam material to support the passenger along side portions of the upper body, the side holder portion having said aperture therein and including the upper protrusion and the lower protrusion, the upper protrusion configured for supporting said passenger at the flank and the lower protrusion configured for supporting said passenger on the side around the waist.

6. A method of manufacturing a seat as in claim 5, wherein the seat back frame includes a main frame that forms a frame for the backrest portion and a side frame attached to side portions of said main frame so as to open outwardly at an obtuse angle, and the side frame is attached to the side portions of the main frame in such a manner that a space corresponding to the aperture is formed between the side portions of the main frame and the side frame.

7. A method of manufacturing a seat as in claim 5, wherein an opening shaping means is attached to said seat back shaping die at a position that corresponds to the side holder portion, to thereby form a hole with the side holder portion and block injection of the foaming agent so that the aperture is formed.

8. A method of manufacturing a seat as in claim 7, wherein said opening shaping means is inserted into said seat back shaping die in such a manner that said opening shaping means is capable of moving forward and backward.

9. A method of manufacturing a seat as in claim 5 further comprising a step of placing a seat covering material, which forms a surface of said seat back, within the seat back shaping die before injecting the foaming agent inside the seat back shaping die.

10. A method of manufacturing a seat as in claim 9 further comprising a step of fixing said seat covering material to said seat back shaping die in tight contact with a shaping surface of said seat back shaping die after being preliminarily set in said seat back shaping die, but before injecting the foaming agent inside said seat back shaping die.

* * * * *

UNITED STATES PATENT AND TRADEMARK OFFICE
CERTIFICATE OF CORRECTION

PATENT NO. : 6,102,481
DATED : August 15, 2000
INVENTOR(S) : Hiroyuki Tateyama

It is certified that error appears in the above-identified patent and that said Letters Patent is hereby corrected as shown below:

Column 1,
Line 17, delete first occurrence of "the".

Column 5,
Line 58, delete first occurrence of "is".

Column 6,
Line 3, "a such" should be -- such a --.

Signed and Sealed this

Second Day of April, 2002

Attest:

JAMES E. ROGAN
*Attesting Officer*     *Director of the United States Patent and Trademark Office*